D. R. COLLIER.
PERAMBULATOR.
APPLICATION FILED DEC. 4, 1908.
930,044.
Patented Aug. 3, 1909.
2 SHEETS—SHEET 2.
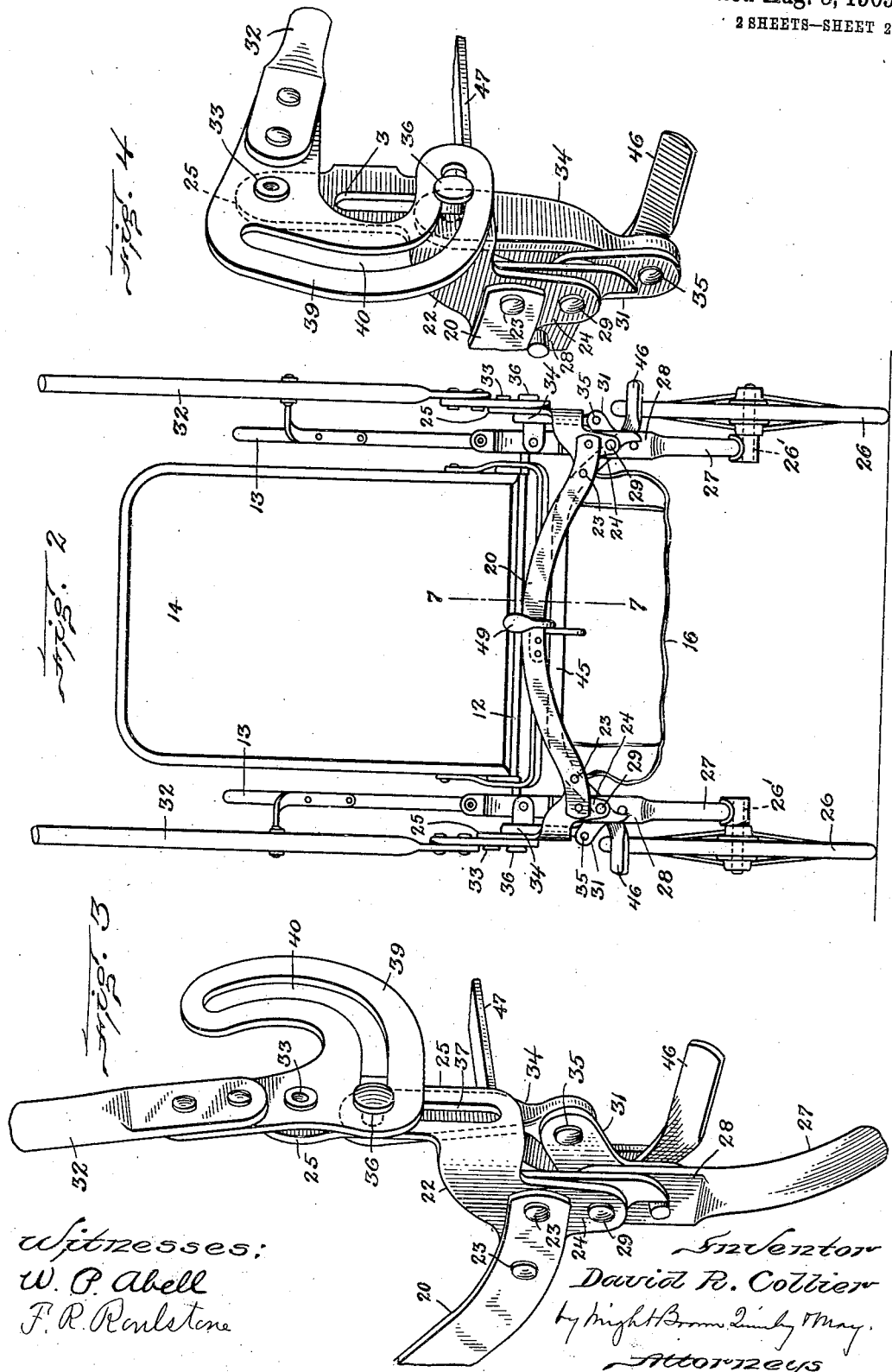
Witnesses:
W. P. Abell
F. R. Roulstone
Inventor
David R. Collier
by Wright Brown Quinby May
Attorneys

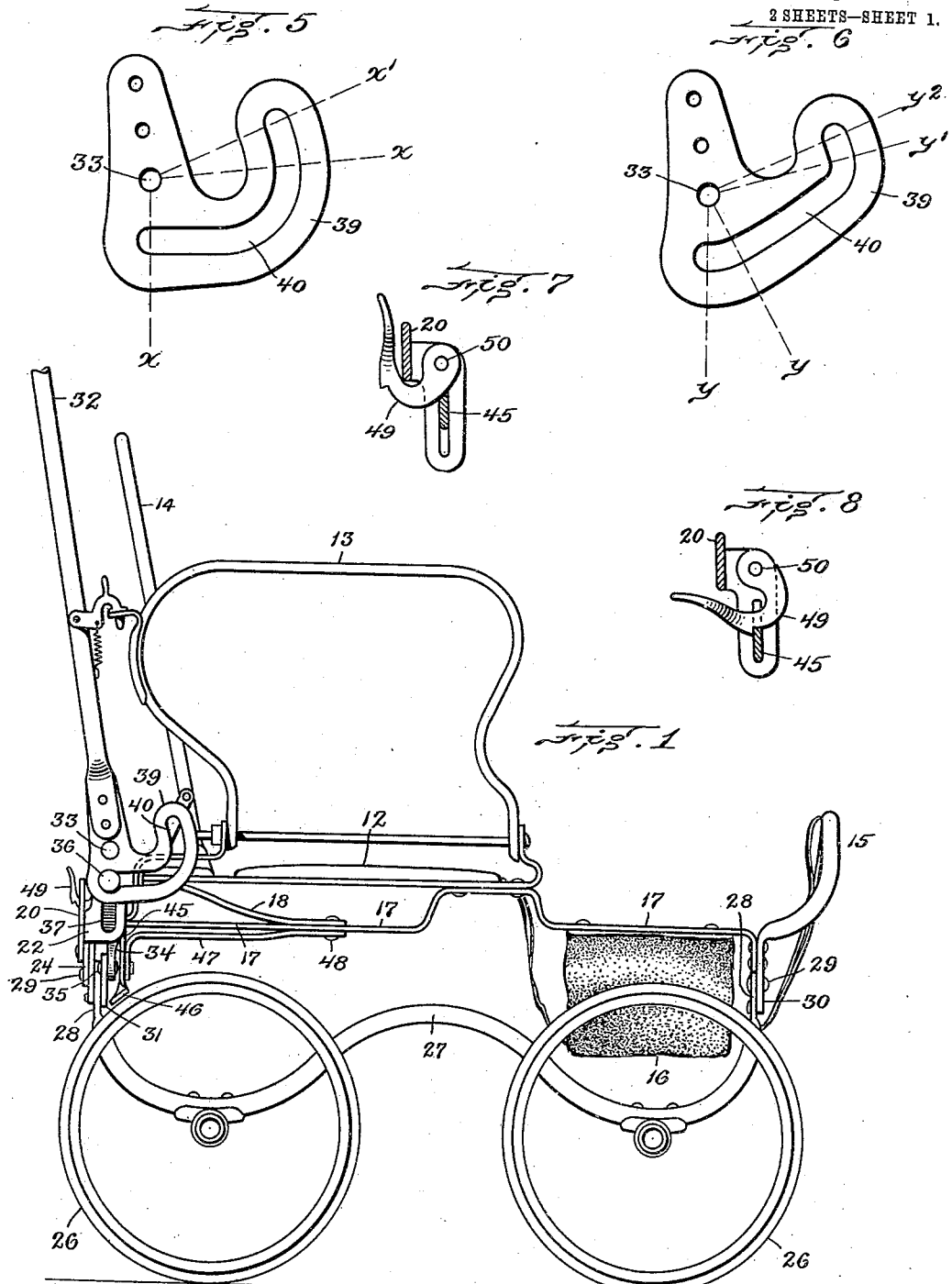

UNITED STATES PATENT OFFICE.

DAVID R. COLLIER, OF GARDNER, MASSACHUSETTS, ASSIGNOR TO COLLIER-KEYWORTH COMPANY, OF GARDNER, MASSACHUSETTS, A CORPORATION OF MASSACHUSETTS.

PERAMBULATOR.

No. 930,044.     Specification of Letters Patent.     Patented Aug. 3, 1909.

Application filed December 4, 1908. Serial No. 465,906.

*To all whom it may concern:*

Be it known that I, DAVID R. COLLIER, of Gardner, in the county of Worcester and State of Massachusetts, have invented certain new and useful Improvements in Perambulators, of which the following is a specification.

This invention relates to perambulators or children's carriages which are adapted to be folded into compact form for storage or transportation, and it has for its object to provide an improved folding perambulator of simple construction adapted to be quickly and conveniently folded and unfolded, and firmly held in its operative position when unfolded or open.

The invention consists in the improvements which I will now proceed to describe and claim.

Of the accompanying drawings, forming a part of this specification,—Figure 1 represents a side elevation showing the chief parts of a folding perambulator embodying my invention. Fig. 2 represents a rear end elevation. Fig. 3 represents a perspective view showing a portion of the main frame, a portion of one of the wheel frames, and a portion of one of the handle-bars, and mechanism for imparting swinging motion from the handle-bar to the wheel frame, the parts being shown in the relative positions they occupy when the carriage is opened. Fig. 4 represents a view similar to Fig. 3 showing the parts in the relative positions they occupy when the carriage is folded. Figs. 5 and 6 represent side views showing the two cam extensions of the handle-bars. Fig. 7 represents a section on line 7—7 of Fig. 2. Fig. 8 represents a view similar to Fig. 7 showing a different adjustment.

The same reference characters indicate the same parts in all the figures.

My improved perambulator comprises a main frame which supports the seat 12, its sides 13 and back 14, the dasher 15, and a suitable foot rest 16. The said frame may be of any suitable general construction, it being sufficiently described by the statement that it includes longitudinal side members 17 suitably formed to support the seat, the dasher, and other parts above referred to, the rear portion of the seat being preferably yieldingly supported by springs 18 interposed between said rear portion and the side members 17 of the main frame. The rear ends of the side members 17 are connected by a transverse member 20 through intermediate connecting members 22 attached by rivets 23 to the ends of the transverse member 20, the said connecting members 22 being rigidly attached to the side members 17, and having downwardly projecting ears 24 and upwardly projecting ears 25.

The usual wheels 26 are mounted on axle arms 26' which are attached to wheel frames 27, said wheel frames being preferably of the curved form represented in Fig. 1, and composed of lengths of tubing, the ends of which are flattened to form ears 28 which are pivoted at 29 to the downwardly bent ears 24 at the rear end of the main frame, and to corresponding ears 30 projecting downwardly at the forward end of the main frame, as shown in Fig. 1.

The entire portion of each wheel frame below the line of the pivots 29 constitutes the longer arm of a bell crank lever, each frame having at its rear end a laterally projecting ear 31 which constitutes a shorter bell crank arm, so that each wheel frame is in effect a bell crank lever, the shorter arm of which projects outwardly from the outer side of the longer arm or body portion of the wheel frame, when the latter is projected to its operative position.

32 32 represents the handle-bars which are pivoted at 33 to the upwardly projecting ears 25 on the main frame, the two handle-bars being connected at their upper ends, as usual, by a suitable cross bar, not shown, the whole constituting a handle arranged as usual at the rear end of the perambulator. The handle-bars are adapted to swing lengthwise of the main frame, or in a direction at right angles to the swinging movement of the wheel frames, the latter being adapted to swing crosswise of the main frame.

Mechanism is provided whereby the forward swinging movement of the handle-bars to fold the carriage applies pressure to the outwardly projecting shorter arms 31 of the wheel frames, and swings said shorter arms downwardly and the frames inwardly, retracting them under the main frame, a reversal of the swinging movement of the handle-bars causing an upward pull of the shorter arms 31 of the wheel frame, and swinging the wheel frames outwardly to their projected outward position. The said mechanism, as here shown, includes a pair of longitudinally movable rods 34 pivoted at 35 to the shorter arms 31 of the wheel frames, each rod having at its upper end a laterally projecting stud 36 which passes through a vertical guiding slot 37 in one of the upwardly projecting ears 25. The handle-bars 32 are provided with means for imparting endwise movements to the rods 34, said rods being moved downwardly by a forward swinging movement of the handle-bars, and thus causing an inward swinging movement or retraction of the wheel frames. When the handle-bars are moved upwardly, the rods 34 are raised and cause an outward swinging movement or projection of the wheel frames. The means here shown, whereby the handlebars are enabled to move the rods 34 endwise, as described, are extensions 39 affixed to the handle-bars, and projecting forwardly from the pivots 33 thereof, when the handle-bars are raised, each extension being provided with a cam-shaped slot 40 through which the stud 36 on the adjacent rod 34 projects. The cam-shaped slots 40 intersect the vertical slots 37 in the ears 25, the studs 36 passing through both of said slots, and each stud having a head which bears against the outer side of one of the handle-bar extensions 39, and is of greater width than the cam-shaped slot 40 therein. The formation of the cam-shaped slots 40 is such that when the handle-bars are raised, the studs 36 occupy the inner ends of said slots, and are held at the same height, the studs 36 being rigidly supported against endwise movement by the edges of the inner ends of the slots, which edges extend practically horizontally across said studs. The extensions 39, therefore, act to lock the rods 34 positively against vertical movement when the handle-bars are raised. The slot 40 of the handle-bar extension at the right hand side of the carriage has a different formation than the slot in the opposite extension, said slots being differently timed so that the forward movement of the handle-bars causes one of the wheel frames to swing inwardly in advance of the other, provision being thus made for swinging the wheel frames inwardly without conflict between them. The formation of the slot 40 in the extension at one side of the main frame is shown in Fig. 5, while the formation of the cam slot in the opposite extension is shown in Fig. 6. By reference to said figures it will be seen that one of the cam-shaped slots has an inner portion $x$—$x$, which is eccentric to the pivot 33, and an outer portion $x$—$x'$ which is concentric with said pivot. The cam slot in the opposite extension has at its inner end a portion $y$—$y$ which is concentric with the pivot 23, a portion $y$—$y'$ which is eccentric to said pivot, and an outer portion $y'$—$y^2$ which is also concentric to the pivot 23. When the handle-bars are first moved forward from their fully raised position, the portion $x$—$x$ of one of the cam slots immediately acts to depress the rod 34 connected therewith, and swing the corresponding wheel frame inwardly, the concentric portion $y$—$y$ of the opposite cam slot moving at the same time along the corresponding stud 36 without imparting movement to said stud and the rod 34 with which it is connected. Consequently there is no movement of the wheel frame connected with the last mentioned rod until the opposite wheel frame has swung inwardly to a considerable extent.

From the foregoing, and by reference to Figs. 5 and 6, it will be seen that the wheel frames are moved successively to and from their retracted positions, one of said wheels when retracted lying in close proximity to the under side of the main frame, and the other frame lying in close proximity to its companion.

The extensions 39 of the handle bars constitute the shorter arms of bell-crank levers, the longer arms of which are the main portions of the handle bars, said shorter arms being slidingly engaged with the rods 34 and having provisions for imparting endwise movement to said rods.

45 represents a brake bar extending crosswise of the main frame at its rear end, and having brake shoes 46. Said brake bar is yieldingly supported by means of spring arms 47 attached at 48 to the side members 17 of the main frame. The spring arms support the brake shoes above the rear wheels, and in such proximity thereto that when the wheels are projected, the brake shoes may be pressed against the tires of the rear wheels.

49 represents a cam lever pivoted at 50 to the rear member 20 of the main frame, said lever bearing against the brake bar 45, and being adapted when moved from the position shown in Fig. 7 to that shown in Fig. 8, to depress the brake bar and engage the brake shoes with the rear wheels, the cam lever locking the brake bar in the last described position. When the cam lever 49 is restored to the position shown in Fig. 7, the spring arms 47 raise the brake shoes from the wheels.

The brake bar 45 is offset at its end portions so that its body portion is sufficiently elevated to permit the inward swinging of the wheels without interference or obstruction by the brake bar.

I claim:

1. In a perambulator, the combination of a main frame, wheel frames pivoted thereto, and adapted to swing crosswise thereof, each frame constituting the longer arm of a bell crank lever and having a shorter bell crank arm at one end, said shorter arms projecting outwardly from the outer sides of the longer arms when the wheel frames are projected, and mechanism for imparting swinging movements to the said shorter arms to retract and project the wheel frames, said mechanism including handle-bars pivoted to the main frame and adapted to swing lengthwise thereof, and members pivoted to the said shorter arms and vertically movable by swinging movements of the handle-bars.

2. In a perambulator, the combination of a main frame, wheel frames pivoted thereto, and adapted to swing crosswise thereof, each frame constituting the longer arm of a bell crank lever and having a shorter bell crank arm at one end, vertically movable rods pivoted to said shorter arms, fixed guides for said rods, and handle-bars pivoted to the main frame and adapted to swing lengthwise thereof, and provided with means for moving the rods endwise to retract and project the wheel frames.

3. In a perambulator, the combination of a main frame, wheel frames pivoted thereto, and adapted to swing crosswise thereof, each frame constituting the longer arm of a bell crank lever and having a shorter bell crank arm at one end, vertically movable rods pivoted to said shorter arms, handle-bars pivoted to the main frame and adapted to swing lengthwise thereof, said bars having extensions containing cam grooves engaged with said rods and adapted to move the same endwise to retract and project the wheel frames, and fixed guides on the main frame for said rods.

4. In a perambulator, the combination of a main frame having upwardly projecting slotted guiding ears at its rear end portion, wheel frames pivoted to the main frame below said guiding ears and adapted to swing crosswise of the main frame, each frame constituting the longer arm of a bell-crank lever, and having a shorter bell-crank arm at one end, rods pivoted to said shorter arms at their lower ends, and having studs at their upper ends engaged with and guided by the slots of said ears, and handle-bars pivoted to said ears above the slots thereof, and provided with extensions containing cam-shaped slots engaged with said studs, and adapted to impart endwise movements to the rods to cause the retraction and projection of the wheel frames.

5. In a perambulator, the combination of a main frame, wheel frames pivoted thereto and adapted to swing crosswise thereof, handle-bars pivoted to the main frame and adapted to swing lengthwise thereof, each handle-bar having an operating cam which swings in the same plane with the arm, and means coöperating with said cams for imparting movements from the handle-bars to the wheel frames.

6. In a perambulator, the combination of a main frame, wheel frames pivoted thereto and adapted to swing crosswise thereof, handle-bars pivoted to the main frame and adapted to swing lengthwise thereof, each handle-bar having an operating cam which swings in the same plane with the arm, and means coöperating with said cams for imparting movements from the handle-bars to the wheel frames, said cams being differently timed to swing the wheel frames successively.

7. In a perambulator, the combination of a main frame, wheel frames pivoted thereto and adapted to swing crosswise thereof, each wheel frame constituting the longer arm of a bell-crank lever, and having at one end a shorter bell-crank arm which projects outwardly from the outer side of the longer arm when the wheel frame is projected, handle-bars pivoted to the main frame, and vertically movable side-frame-swinging connections between the handle-bars and the bell-crank arms on the wheel frames, said connections being movable vertically by the handle-bars, and pivoted to the said shorter arms.

8. In a perambulator the combination of a main frame, wheel frames pivoted thereto and adapted to swing crosswise thereof, each wheel frame constituting the longer arm of a bell-crank lever, and having a shorter bell-crank arm at one end, handle-bars pivoted to the main frame, and having operating cams, and means for transmitting motion from said cams to the shorter bell-crank arms on the wheel frames.

9. In a perambulator, the combination of a main frame, wheel frames pivoted thereto and adapted to swing crosswise thereof, handle-bars pivoted to the main frame and adapted to swing lengthwise thereof, said handle-bars and wheel frames constituting the longer arms of bell crank levers, and each having a shorter bell-crank arm, and connecting rods between the shorter arms of the handle-bars and the shorter arms of the wheel frames, the shorter arms of the handle-bars being slidingly engaged with the connecting rods, and having provisions for imparting endwise movement to said rods, to retract and project the wheel frames.

In testimony whereof I have affixed my signature, in presence of two witnesses.

DAVID R. COLLIER.

Witnesses:
 THATCHER B. DUNN,
 FLORENCE L. MOORE.